United States Patent
Charbonneau et al.

(10) Patent No.: US 11,717,848 B2
(45) Date of Patent: Aug. 8, 2023

(54) MULTIPLE IMMEDIATE PASS APPLICATION OF HIGH THICKNESS SPRAY FOAMS

(71) Applicant: JOHNS MANVILLE, Denver, CO (US)

(72) Inventors: Chanel Charbonneau, Lone Tree, CO (US); Yusheng Zhao, Littleton, CO (US); Elam Leed, Littleton, CO (US); Kathryn Miks, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/038,626

(22) Filed: Sep. 30, 2020

(65) Prior Publication Data
US 2022/0097096 A1    Mar. 31, 2022

(51) Int. Cl.
| | |
|---|---|
| *B05D 1/02* | (2006.01) |
| *B05D 7/00* | (2006.01) |
| *B32B 5/20* | (2006.01) |
| *B32B 23/04* | (2006.01) |
| *B32B 27/36* | (2006.01) |

(52) U.S. Cl.
CPC ............... *B05D 1/02* (2013.01); *B05D 7/56* (2013.01); *B32B 5/20* (2013.01); *B32B 23/048* (2013.01); *B32B 27/36* (2013.01); *B32B 2250/04* (2013.01); *B32B 2266/0264* (2013.01); *B32B 2266/08* (2013.01); *B32B 2307/304* (2013.01); *B32B 2607/00* (2013.01)

(58) Field of Classification Search
CPC . B05D 1/02; B05D 7/24; B05D 7/582; B05D 7/584; B05D 7/587; B32B 5/20; B32B 23/048; B32B 27/36; B32B 2250/04; B32B 2266/0264; B32B 2266/08; B32B 2307/304; B32B 2607/00
See application file for complete search history.

(56) References Cited

U.S. PATENT DOCUMENTS

| | | | |
|---|---|---|---|
| 9,809,674 B2 | 11/2017 | Shieh | |
| 2011/0237770 A1* | 9/2011 | Daute | C08G 18/4887 560/186 |
| 2012/0009414 A1* | 1/2012 | Golini | C08G 18/4208 427/373 |

FOREIGN PATENT DOCUMENTS

| | | | | |
|---|---|---|---|---|
| CA | 2153293 A | * | 1/1997 | ............... E04B 1/76 |
| EP | 2975186 A1 | * | 1/2016 | ........... C08G 18/092 |
| JP | 06263910 A | * | 9/1994 | |

(Continued)

OTHER PUBLICATIONS

Environmental Health Technical Brief: Spray Polyurethane Foam Insulation. Technical Brief [online]. Connecticut Department of Public Health, Dec. 2010 [retrieved on Mar. 29, 2022]. Retrieved from the Internet.*

(Continued)

*Primary Examiner* — William P Fletcher, III
(74) *Attorney, Agent, or Firm* — Robert D. Touslee

(57) ABSTRACT

A method of applying a closed cell spray foam insulation may include spraying a first layer of a closed cell spray foam insulation into a wall cavity. A B-side mixture of the closed cell spray foam insulation may include a polyol blend having a polyester polyol having a functionality of at least about 3.0 and a polyether polyol. The method may include spraying at least one additional layer of the closed cell spray foam insulation against the first layer within 5 minutes of spraying the first layer.

15 Claims, 2 Drawing Sheets

(56) References Cited

FOREIGN PATENT DOCUMENTS

| JP | 2005314677 | A | * | 11/2005 | | |
|----|------------|----|---|---------|---|---|
| JP | 2010150419 | A | * | 7/2010 | | |
| WO | WO-2015143087 | A1 | * | 9/2015 | ......... | B29C 44/1233 |

OTHER PUBLICATIONS

< https://portal.ct.gov/-/media/Departments-and-agencies/DPH/dph/environmental_health/eoha/pdf/TechnicalBriefSPFpdf.pdf>. (Year: 2010).*

* cited by examiner

MULTIPLE IMMEDIATE PASS APPLICATION OF HIGH THICKNESS SPRAY FOAMS

BACKGROUND OF THE INVENTION

Spray foams are widely used as building insulation materials due to their excellent thermal resistance, air sealing attributes, and mechanical properties. Spray foam insulation is often formed as the polymerizing reactants are being sprayed directly into the building envelope to be insulated, usually with the help of a blowing agent. Conventional high lift spray foams often perform poorly when sprayed in thick single pass applications, often exhibiting poor dimensional stability and non-uniform density, with lower density at the core than near the surface of the foam. To combat these effects, some installation methods may implement multiple spray passes to create a number of thinner layers that together have a thickness of a single pass layer. However, multiple passes of some spray foams must typically be applied with a waiting period (sometimes upwards of 30 minutes depending on foam thickness) in between passes to minimize temperature buildup in the foam due to the exothermic chemical reaction that forms the foam insulation. Without these waiting periods, heat may build up to the point that a temperature of the foam may approach a self-ignition temperature and create a risk of fire. As such, multi-pass spray foam applications are inefficient and oftentimes impractical. Improvements to high lift spray foams are desired.

BRIEF SUMMARY OF THE INVENTION

In one embodiment, a method of applying a closed cell spray foam insulation is provided. The method may include spraying a first layer of a closed cell spray foam insulation onto a substrate. A B-side mixture of the closed cell spray foam insulation may include a polyol blend including a polyester polyol having a functionality of at least about 3.0 and a polyether polyol. The method may include spraying at least one additional layer of the closed cell spray foam insulation against the first layer within 5 minutes of spraying the first layer.

In some embodiments, each of the first layer and the at least one additional layer may have a thickness of between about 1.5 inches and 2.5 inches. The at least one additional layer may be sprayed within one minute after spraying the first layer. The first layer and the at least one additional layer may be sprayed at a temperature of between about 100° F. and 150° F. and a pressure of between about 1000 psi and 1500 psi. The closed cell spray foam insulation may include a density of between about 1.9 pcf and 3.0 pcf after curing. The B-side mixture of the closed cell spray foam insulation may include between about 49% and 90% by weight of the polyol blend. The B-side mixture of the closed cell spray foam insulation may include between about 36% and 55% of the polyester polyol having a functionality of at least about 3.0 and between about 13% and 35% of the polyether polyol.

In another embodiment, a method of applying a closed cell spray foam insulation may include spraying a first layer of a closed cell spray foam insulation onto a substrate. The closed cell spray foam insulation may include an A-side mixture and a B-side mixture. The A-side mixture of the closed cell spray foam insulation may include one or more polyisocyanate compounds. The B-side mixture of the closed cell spray foam insulation may include a polyol blend including a polyester polyol having a functionality of at least about 3.0 and a polyether polyol. The method may include spraying at least two additional layers of the closed cell spray foam insulation against the first layer within 5 minutes of spraying a previous layer.

In some embodiments, each of the at least two additional layers may be sprayed within ten seconds after spraying the previous layer. The B-side mixture of the closed cell spray foam insulation may include a fire retardant, a catalyst, a blowing agent, and a surfactant. The spray foam insulation may have an R value of at least 6.0 per inch once cured. The one or more polyisocyanate compounds of the A-side mixture of the closed cell spray foam insulation may include methylene diphenyl diisocyanate. At least one of the at least two additional layers may be sprayed prior to at least a portion of the previous layer reaching a tack-free phase. Each layer of the spray foam insulation may exhibit a dimensional stability of less than about ±15% volumetric change at 70° C. at 97% relative humidity across an entire thickness of the layer once cured. The at least two additional layers may include three layers. A combined R value of the first layer and the three layers may be at least 49.

In another embodiment, a wall cavity is provided. The cavity may include a plurality of structural support members coupled together to form a frame. The wall cavity may include a wall board attached to an exterior side of the frame to form an exterior wall or surface of the structure. The plurality of structural support members and the wall board may define a wall cavity. The cavity may include a plurality of layers of a spray foam insulation positioned within the wall cavity. The spray foam insulation may include a polyester polyol having a functionality of at least about 3.0 and a polyether polyol.

In some embodiments, each layer of the spray foam insulation may have a density of between about 1.9 pcf and 3.0 pcf across an entire thickness of the layer. Each layer of the spray foam insulation may exhibit a dimensional stability of less than about ±15% volumetric change at 70° C. at 97% relative humidity across an entire thickness of the layer. The spray foam insulation may have an R value of at least 6.0 per inch. The plurality of layers may include 4 layers. Each of the 4 layers may be between about 1.5 and 2.0 inches thick. A combined R value of the plurality of layers may be at least 49.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
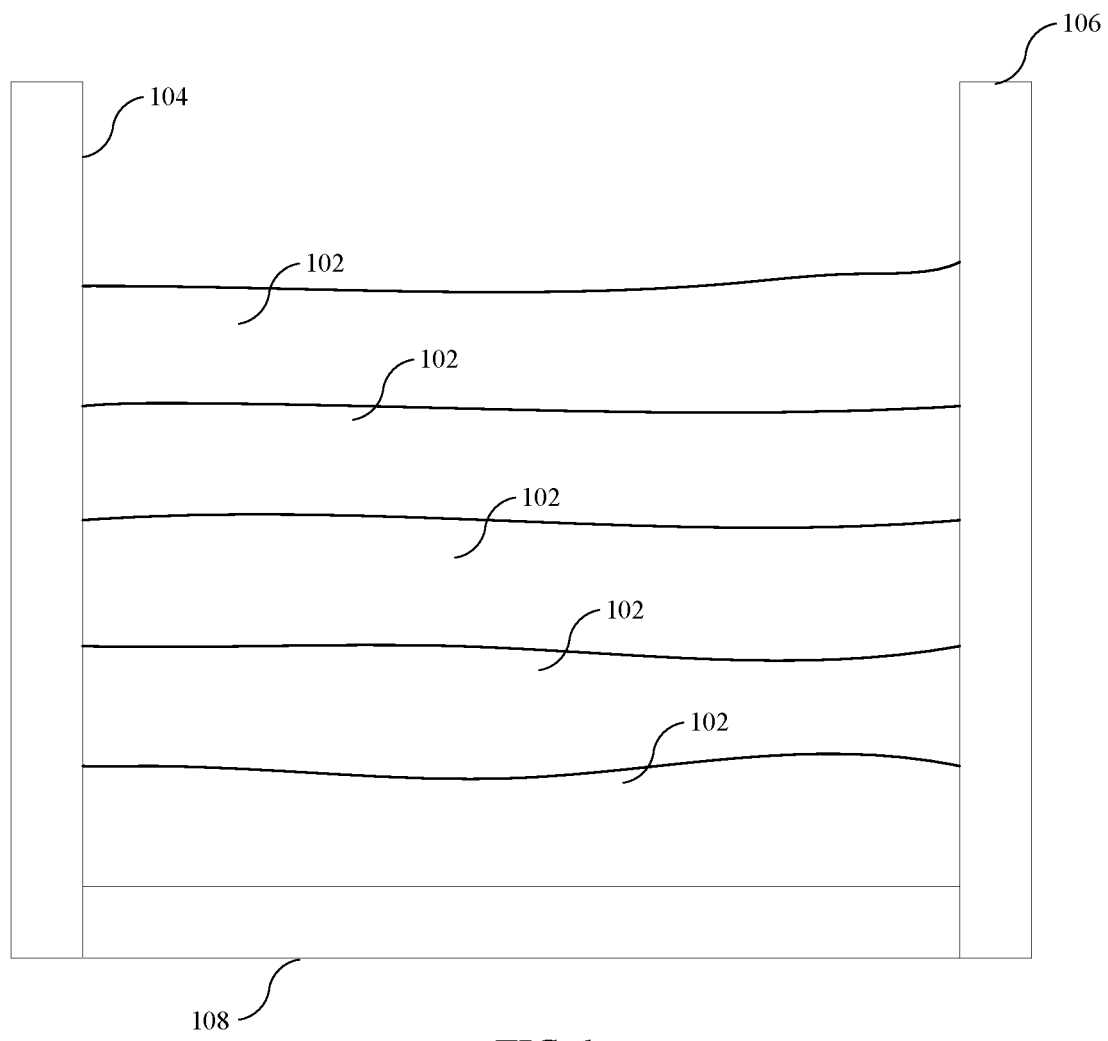
FIG. 1 depicts an embodiment of an insulation system according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to high thickness closed cell spray foam insulations and methods of applying spray foam insulations that significantly reduce installation time without sacrificing finished material properties. In particular, embodiments of the present invention provide spray foams that may be sprayed in a wall cavity over multiple passes as soon as a previous layer has achieved the end-of-rise and tack-free stages of the foam (typically within 5-10 seconds after the foam contacts a wall or ceiling substrate), thereby significantly reducing the wait time for multi-pass foam installations, as conventional multi-pass spray foam applications require wait times (possibly being as much as 30 minutes depending on a thickness of the foam) between layers. Additionally, by applying the spray foam insulation using a multi-pass process, better dimensional stability may be maintained, and the foam insulation may have a more consistent density profile across a thickness of the foam.

The closed cell spray foam insulations of the present invention may include (i) a polyisocyanate reactant and (ii) a polyol reactant. The spray foam insulations are made by combining separate liquid mixtures that include the polyisocyanates (the A-side mixture) and the polyols (the B-side mixture) and then immediately spraying the combined mixtures through a spray machine directly into a building envelope to be thermally insulated, such as a wall and joist cavity. Embodiments enable quicker multi-pass spray applications through the use of a closed cell spray foam formulation that uses a B-side mixture having a high-functional polyester polyol. During application, an exothermic reaction occurs as the A-side and B-side mixtures are combined, thereby creating the foam insulation. The exothermic reaction may generate a large amount of heat, which may create a fire risk in conventional multi-pass spray foam applications as the reaction temperature approaches a self-ignition temperature of the foam. To eliminate this risk, conventional spray foams require extended waiting periods, oftentimes in excess of 30 minutes, between passes to prevent buildup of excessive heat. However, by using a B-side mixture that includes a high-functional polyester polyol, closed cell spray foams of the present invention create exothermic reactions that generate a maximum temperature that is several hundred degrees lower than a self-ignition temperature of the foam. This significantly reduces or eliminates any fire risk associated with applying multiple layers of the foam within a short amount of period. Accordingly, subsequent layers of the closed cell spray foams of the present invention may be applied within seconds of the application of a prior layer without excessive temperatures being generated.

As previously indicated, the spray foam may be applied using a spray machine that combines the A-side and B-side mixtures and sprays the combined mixtures onto a wall or ceiling substrate. The spray machine may include a first transfer pump for carrying the A component and a second transfer pump for carrying the B component. The A and B components may be transferred at a prescribed volume ratio (often 1:1) through a heated dual hose into a spray gun, where the components mix together to form the spray foam insulation product that is released for administration at the building envelope. In some practices, the spray foam insulation product may be stored in and administered from a smaller, portable can that maintains the A-side and B-side mixtures in two separate drums or containers until ready to be combined and dispensed. In other practices, the SPF liquids can be stored as a pre-combined and partially-reacted blend. The hoses of the spray gun may be maintained at between about 100° F. and 150° F., oftentimes between about 100° F. and 125° F. In some embodiments, the spray proportioner may include a preheater that heats the A-side mixture and B-side mixture prior to the A-side mixture and B-side mixture reaching the hose. In some embodiments, the preheater for each mixture may be maintained at a same temperature, such as between about 95° F. and 125° F. In other embodiments, the A-side may be preheated to a temperature of between about 95° F. and 120° F. while the B-side may be preheated to a temperature of between about 105° F. and 125° F. The spray foam insulation may be sprayed from the spray gun at a pressure of between about 1000 psi and 1500 psi.

The A-side mixture of the spray foam insulation may include one or more polyisocyanate compounds. Exemplary polyisocyanates may include substituted or unsubstituted polyisocyanates, and may more specifically include aromatic, aliphatic, and cycloaliphatic polyisocyanates having at least two isocyanate functional groups. Specific exemplary aromatic polyisocyanates include 4,4'-diphenylmethane diisocyanate (MDI), polymeric MDI (PMDI), toluene disisocyanate, and allophanate modified isocyanate. A commercial example of a PMDI that may be used in the present formulations is Rubinate® M manufactured by Huntsman Polyurethanes of The Woodlands, Tex. This PMDI has a viscosity range of about 200 to about 300 cps at 25° C. (e.g., 190 cps at 25° C.), a functionality range of about 2.3 to about 3.0, and an isocyanate content that ranges from about 28% and about 35% (e.g., 31%).

The formation of closed cell foam may require the presence of a sufficient amount of a reactive polyol or polyols to support the reaction that creates a polyurethane foam from the polyisocyanate compounds. For example, polyols contain reactive hydroxyl (OH) groups which react with isocyanate (NCO) groups on isocyanates to form polyurethane foams. The B-side mixture may include two or more polyol compounds. A first polyol may be a high-functional polyester polyol, which may be a polyester polyol having a functionality of at least 3.0. Polyol functionality refers to the average number of OH groups per molecule. Increasing the number of OH groups results in greater crosslinking, which may yield stiffer, harder foams with enhanced chemical and thermal resistance. Moreover, the inclusion of a high-functional polyester polyol may contribute to the spray foams of the present invention exhibiting low maximum temperatures during exothermic reactions of the A-side and B-side mixtures at the time of application. These temperatures are significantly below the self-ignition temperature of the foam, oftentimes up to about 300° F. below the self-ignition temperature. This enables secondary passes of spray foam insulation to be applied immediately after a previous layer has reached the end-of-rise and tack-free phases (often between about 5 and 10 seconds after the spray foam contacts the substrate, although this time may vary based on a substrate type, ambient conditions, and/or processing temperature), which enables the installer to forego the 30 minute waiting period associated with multi-pass applications of conventional closed cell spray foams.

Suitable high-functional polyester polyols may include hydroxyl numbers (mg KOH/g) of between about 360 and about 380. The high-functional polyester polyols may have a viscosity of between about 4,500 and 7,500 centipoise at 25° C. The high-functional polyester polyols may have an acid number (mg KOH/g) of less than about 1.8 and/or may have a water content of less than about 0.15% by weight. Commercial examples of suitable high-functional polyester polyols may include Isoexter TB-375 produced by Coim USA Inc. of West Deptford, N.J. and/or TEROL® 649 polyol produced by Huntsman Corporation of The Woodlands, Tex.

The second polyol may include one or more polyether polyols, which may be made by polymerizing one or more types of epoxides, such as ethylene oxide or propylene oxide. Polyether polyols may also be made by polymerizing the epoxide with a polyol such as a diol (e.g., glycol), triol (e.g., glycerin), or other polyol. Exemplary polyether polyols may include polyether diols such as polyether polyethylene glycol, polypropylene glycol, and poly(tetramethylene ether) glycol, among other polyether diols. Additional exemplary polyether polyols that may be used in the present formulations are sold under the tradename Jeffol® by Huntsman Polyurethanes of The Woodlands, Tex.

The B-side mixture of the spray foams of the present invention may include between about 36% and 55% by weight of the high-functional polyester polyol and between about 13% and 35% of the polyether polyol. The B-side mixture may also include a number of other components. For example, the B-side mixture may include water, one or more fire retardants, one or more catalysts, one or more blowing agents, one or more surfactants, and/or one or more additional additives. Water may be included in an amount of between about 1% and 3% by weight of the B-side mixture.

As indicated above, the B-side mixture may include one or more fire retardants. The fire retardant included in a spray foam formulation according to embodiments may be of any suitable type, for example a non-halogenated fire retardant or a halogenated fire retardant. The fire retardant may be reactive (containing isocyanate reactive functionality) or may be non-reactive.

Exemplary non-halogenated fire retardants may include organo-phosphate compounds, organo-phosphite compounds, and organo-phosphonate compounds. The organo-phosphate compounds can have the general formula:

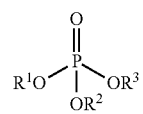

Organo-Phosphate Compounds where $R^1$, $R^2$ and $R^3$ are independently an alkyl group, an olefin group, a hydroxy alkyl group, or an aromatic group. Exemplary organo-phosphate compounds include butyl diphenyl phosphate, dibutyl phenyl phosphate, triphenyl phosphate, and triethyl phosphate (TEP), among other organo-phosphate compounds.

The organo-phosphite compounds can have the general formula:

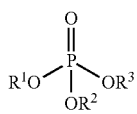

Organo-Phosphite Compounds where $R^1$, $R^2$ and $R^3$ are independently an alkyl group, an olefin group, a hydroxy alkyl group, or an aromatic group. Exemplary organo-phosphite compounds include tris(2,4-di-t-butylphenyl)phosphite.

The organo-phosphonate compounds can have the general formula:

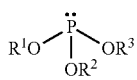

Organo-Phosphonate Compounds where $R^1$, $R^2$ and $R^3$ are independently an alkyl group, an olefin group, a hydroxy alkyl group, or an aromatic group. Exemplary organo-phosphonate compounds include diethyl hydroxylmethyl phosphonate (DEHMP), dialkyl hydroxyalkanephosphonate (e.g., dimethyl hydroxymethylphosphonate), and diaryl hydroxyalkanephosphonate (e.g., diphenyl hydroxymethylphosphonate) among other organo-phosphonate compounds.

Exemplary spray foam formulations may include the use of one of more of the above classes of phosphorous-containing, non-halogenated fire retardants. For example, the spray foam formulation may include an organo-phosphate compound, an organo-phosphite compound, or an organo-phosphonate compound. Additional examples include a combination of an organo-phosphate compound and organo-phosphite compound, a combination of an organo-phosphate compound and organo-phosphonate compound, or a combination of an organo-phosphite compound and organo-phosphonate compound. Further examples include combinations of an organo-phosphate compound, an organo-phosphite compound, and an organo-phosphonate compound.

In other embodiments, example spray foam formulations may include one or more halogenated fire retardants, for example tris(1-chloro-2-propyl)phosphate (TCPP), brominated diol, brominated triol, chlorinated phosphate, other halogenated fire retardants, or combinations thereof. In still other embodiments, a combination of halogenated and non-halogenated fire retardants may be used. The B-side mixture may include between about 8% and 16% by weight of a flame retardant.

The B-side mixture may also include one or more catalysts, such as an amine catalyst and/or a metal catalyst, among other catalysts. An amine catalyst may include a tertiary amine, treiethylenediamine (TEDA), N-methylimidazole, 1,2-dimethyl-imidazole, N-methylmorpholine, N-ethylmorpholine, triethylamine, N,N'-dimethyl-piperazine, 1,3,5-tris(dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, and mixtures thereof. Examples of suitable metal catalysts include potassium, tin, bismuth, and zinc based catalysts. The B-side mixture may include between about 2.3% and 3.7% by weight of catalyst. In some embodiments, the B-side mixture may include between about 2.0% and 3.0% by weight of an amine catalyst and between about 0.3% and 0.7% by weight of a metal catalyst.

The B-side mixture may include a blowing agent, such as a fluorocarbon gas (e.g., HFC-245-fa, HFO-1336mzz, 365-mfc, HFO 1233zd(E)). The blowing agent may be present in amounts between about 7% and 12% by weight of the B-side mixture. The B-side mixture may also include one or more surfactants. Surfactants may reduce surface tension during foaming and may affect the cell structure of the foam. Surfactants may include a silicone surfactant, an organic surfactant, a silicone polyether copolymer, silicone-polyoxyalkylene block copolymers, nonionic polyoxyalkylene glycols and their derivatives, ionic organic salts, ether sulfates, fatty alcohol sulfates, sarcosinates, amine oxides, sulfonates, amides, sulf-succinates, sulfonic acids, alkanol amides, ethoxylated fatty alcohol, and nonionics such as polyalkoxylated sorbitan. Example surfactants may include polydimethylsiloxane-polyoxyalkylene block copolymers. The surfactants may be present in amounts of between about 0.8% and 1.0% by weight of the B-side mixture. In some embodiments, the B-side mixture may include one or more additives, such as dyes, emulsifiers, and/or cross-linkers. The B-side mixture may contain between about 1% and 4% by weight of additives.

Once cured, the closed cell spray foam may exhibit a fire retardancy sufficient to pass flame tests in accordance with ASTM E-84. The foam may have a density of at least 1.9 pcf, oftentimes between about 1.9 pcf and 3.0 pcf, more often between about 2.0 pcf and 2.5 pcf. The foam may have a dimensional stability of less than or about 15%, less than or about 14%, less than or about 13%, less than or about 12%, less than or about 11%, less than or about 10%, or less at 70° C. at 97% relative humidity in accordance with ASTM D2126. The foam may have an R value of at least 6.0 per inch, oftentimes at least about 7.0 per inch.

Table 1 shows one embodiment of a closed cell spray foam B-side formulation according to the present invention.

TABLE 1

Closed cell spray foam formulation for
multi-pass installation applications

| | % by weight of B-side formulation |
|---|---|
| High-functionality polyester polyol | 36-55 |
| Polyethyl polyol | 13-35 |
| Water | 1-3 |
| TCPP | 8-16 |
| Amine catalyst | 2-3 |
| Metal catalyst | 0.3-0.7 |
| HFC-245fa OR HFO-1336mzz OR HFO-1233zd(E) | 7-12 |
| Silicone | 0.8-1 |
| Additive | 1-4 |

Referring now to FIG. 1, a cross-sectional view of an insulation system 100 is shown with multiple layers of spray foam insulation 102 positioned between a first wall stud 104 (or other structural support) and second wall stud 106 attached to a wall board 108. The wall board 108 may be a foam board, particle board, plywood board, and/or other board. The spray foam insulation 102 may be a closed cell spray foam insulation formed by a reaction between the A-side mixture and B-side mixture described above. For example, the spray foam insulation may be formed from a B-side mixture containing a high-functionality polyester polyol, oftentimes in the amount of 36%-55% by weight of the B-side mixture. The cured closed cell spray foam may exhibit a fire retardancy sufficient to pass flame tests in accordance with ASTM E-84 and may have a density of at least 1.9 pcf across an entire thickness of a given layer of the spray foam insulation 102. In some embodiments, a variance of the density of the spray foam insulation across a given layer may be less than about 10%, less than about 9%, less than about 8%, less than about 7%, less than about 6%, less than about 5%, or less, such that each layer has a substantially uniform density throughout a thickness of the layer. The foam may have a dimensional stability of less than or about ±15% volumetric change at 97% relative humidity in accordance with ASTM D2126 and may have an R value of at least 6.0 per inch, oftentimes at least 7.0 per inch.

While illustrated with four layers of spray foam insulation 102, it will be appreciated that any number of layers (including a single layer) may be utilized. In embodiments using multiple layers, the boundary lines of each layer may be visible when viewing a cross-section of the insulation system 100. Typically, as the number of layers increases, a thickness of each layer is decreased. Table 2 shows examples of layer thicknesses for various numbers of layers of spray foam insulation 102, as well as a total R value for a spray foam insulation having an R value of 7.0 per inch. In practice, the thickness of a given layer may vary by less than 20%, less than 15%, less than 10%, or less relative to the disclosed thickness based on the skill of the installer.

TABLE 2

Recommended Immediate Pass Thicknesses

| Passes | Pass Thickness (inches) | Total Thickness (inches) | Total R Value |
|---|---|---|---|
| 1 | 4 | 4 | 28 |
| 2 | 2.5 + 2.5 | 5 | 35 |
| 3 | 2 + 2 + 2 | 6 | 42 |
| 4 | 1.75 + 1.75 + 1.75 + 1.75 | 7 | 49 |

Figure 2:
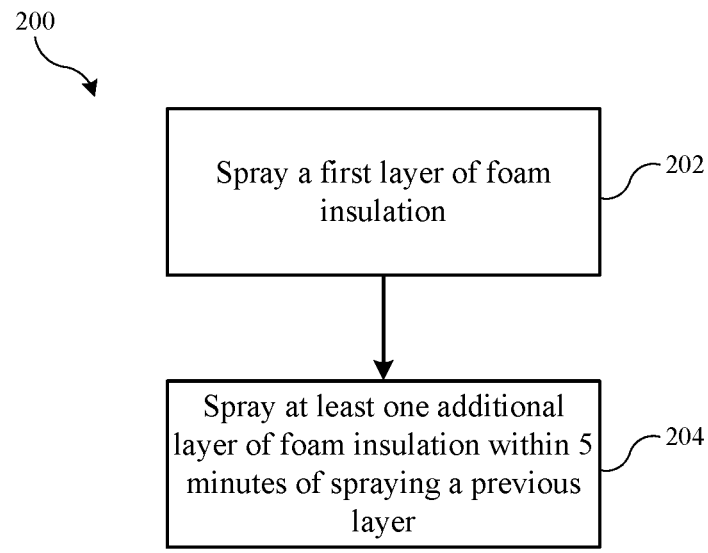
FIG. 2 is a flowchart depicting a method of applying a closed cell spray foam insulation according to embodiments.

Turning now to FIG. 2, an insulation method 200 for insulating a component of a building with spray foam insulation is provided. The method 200 may include spraying a first layer of a closed cell spray foam insulation onto a substrate, such as into a wall cavity, a roof deck, ceiling framing, exterior building surface, and/or other surface of a structure. The closed cell spray foam insulation may be similar to that described herein. For example, the insulation may include an A-side mixture and a B-side mixture that react when installed to form the closed cell foam. The A-side mixture may include one or more polyisocyanate compounds, such as MDI and/or PMDI. The B-side mixture may include a polyol blend including a polyester polyol having a functionality of at least about 3.0 and a polyether polyol. In some embodiments, the B-side mixture of the closed cell spray foam insulation may include between about 49% and 90%, and more commonly between about 60% and 75% by weight of the polyol blend. The B-side mixture of the closed cell spray foam insulation may include between about 36% and 55% of the polyester polyol having a functionality of at least about 3.0 and between about 13% and 35% of the polyether. The B-side mixture may include further components. For example, the B-side mixture may include one or more fire retardants, one or more catalysts, one or more surfactants, water, and/or one or more additional additives. In some embodiments, spraying the A-side and B-side components of the formulation into the wall cavity may be done with the aid of a blowing agent. For example, the blowing agent may be a fluorocarbon gas (e.g., HFC-245fa, HFO-1336mz, 365-mfc, and/or HFO 1233zd(E)).

At block 204, the method 200 may include spraying at least one additional layer of the closed cell spray foam insulation against the first layer within 5 minutes of spraying the first layer. Each additional layer may be sprayed against a previous layer as soon as the previous layer has achieved the end-of-rise and tack-free phases, which typically occurs within 5-10 seconds of the spray foam contacting the substrate. Thus, oftentimes, each additional layer may be applied within 2 minutes of spraying the previous layer, within 90 seconds of spraying the previous layer, within 60 seconds of spraying the previous layer, within 50 seconds of spraying the previous layer, within 40 seconds of spraying the previous layer, within 30 seconds of spraying the previous layer, within 20 seconds of spraying the previous layer, within 10 seconds of spraying the previous layer, within 5 seconds of spraying the previous layer, within 1 second of spraying the previous layer, and/or less. For example, immediately upon completing a given layer an installer may begin spraying a subsequent layer against a beginning portion of the previous layer if the beginning portion of the previous layer had already reached the tack-free phase. In some embodiments, an additional layer of spray foam insulation may be sprayed before a portion of the previous layer has reached a tack-free phase.

Each layer may be applied using a spray gun that is fluidly coupled with two storage tanks (one for the A-side mixture and one for the B-side mixture) via heated hoses. A nozzle of the spray gun may combine the two mixtures at a prescribed volume ratio (often 1:1) and eject the combined mixtures into the wall cavity to form the spray foam insulation product. The hoses of the spray gun may be maintained at between about 100° F. and 150° F. and the spray foam insulation may be sprayed from the spray gun at a pressure of between about 1000 psi and 1500 psi. In some embodiments, the A-side mixture and B-side mixture may be preheated prior to delivery through the heated hoses. For example, the A-side and B-side mixtures may be preheated between about 95° F. and 125° F. The layers may be sprayed in any pattern, such as horizontally and/or vertically. Oftentimes, each layer may be applied at a thickness of between about 1 inch to 2.5 inches (oftentimes between about 1.5 inches and 2.5 inches), although the thickness of each layer may depend on how many total layers of insulation are to be installed and/or a total R value desired.

Once cured, the closed cell spray foam insulation may have a density of between about 1.9 pcf and 3.0 pcf, oftentimes between about 2.0 pcf and 2.5 pcf. In some embodiments, a variance of the density of the spray foam insulation across a given layer may be less than about 10% such that each layer has a substantially uniform density throughout a thickness of the layer. Once cured, the spray foam insulation may have an R value of at least 6.0 per inch, oftentimes at least 7.0 per inch. In such embodiments, four layers of insulation of approximately 1.75 inches per layer will result in the spray foam insulation having a total R value of at least 49. Each layer of the cured spray foam insulation may exhibit a dimensional stability of less than about ±15% volumetric change at 70° C. at 97% relative humidity across an entire thickness of the layer. The cured closed cell spray foam may exhibit a fire retardancy sufficient to pass flame tests in accordance with ASTM E-84.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of applying a closed cell spray foam insulation, comprising:
    spraying a first layer of a closed cell spray foam insulation onto a vertical substrate, wherein a B-side mixture of the closed cell spray foam insulation comprises a polyol blend comprising a polyester polyol having a functionality of at least about 3.0 and a polyether polyol, wherein the polyester polyol comprises a viscosity of between about 4,500 and 7,500 centipoise at 25° C.; and
    spraying at least one additional layer of the closed cell spray foam insulation against the first layer within 5 minutes of spraying the first layer, wherein each of the first layer and the at least one additional layer has a thickness of between about 1.5 inches and 2.5 inches.

2. The method of applying a closed cell spray foam insulation of claim 1, wherein:
    the at least one additional layer is sprayed within one minute after spraying the first layer.

3. The method of applying a closed cell spray foam insulation of claim 1, wherein:
    the first layer and the at least one additional layer are sprayed at a temperature of between about 100° F. and 150° F. and a pressure of between about 1000 psi and 1500 psi.

4. The method of applying a closed cell spray foam insulation of claim 1, wherein:
    the closed cell spray foam insulation comprises a density of between about 1.9 pcf and 3.0 pcf after curing.

5. The method of applying a closed cell spray foam insulation of claim 1, wherein:
    the B-side mixture of the closed cell spray foam insulation comprises between about 49% and 90% by weight of the polyol blend.

6. The method of applying a closed cell spray film insulation of claim 1, wherein:
    the B-side mixture of the closed cell spray foam insulation comprises between about 36% and 55% of the polyester polyol having a functionality of at least about 3.0 and between about 13% and 35% of the polyether polyol.

7. The method of applying a closed cell spray foam insulation of claim 1, wherein:
    the polyether polyol is a polymer of one or more types of epoxides or a copolymer of one or more types of epoxides and a diol or a triol; and
    the B-side mixture of the closed cell spray foam insulation comprises between about 13% and 35% of the polyether polyol.

8. A method of applying a closed cell spray foam insulation, comprising:
    spraying a first layer of a closed cell spray foam insulation onto a vertical substrate, wherein:
    the closed cell spray foam insulation comprises an A-side mixture and a B-side mixture;
    the A-side mixture of the closed cell spray foam insulation comprises one or more polyisocyanate compounds; and
    the B-side mixture of the closed cell spray foam insulation comprises a polyol blend comprising a polyester polyol having a functionality of at least about 3.0 and a polyether polyol, wherein the polyester polyol comprises a viscosity of between about 4,500 and 7,500 centipoise at 25° C.; and
    spraying at least two additional layers of the closed cell spray foam insulation against the first layer within 5 minutes of spraying a previous layer, wherein each of the first layer and each of the at least two additional layers has a thickness of between about 1.5 inches and 2.5 inches; and
    wherein a maximum temperature of the first layer is less than a self-ignition temperature of the closed cell spray foam insulation.

9. The method of applying a closed cell spray foam insulation of claim 8, wherein:
    each of the at least two additional layers is sprayed within ten seconds after spraying the previous layer.

10. The method of applying a closed cell spray foam insulation of claim 8, wherein:
    the B-side mixture of the closed cell spray foam insulation further comprises a fire retardant, a catalyst, a blowing agent, and a surfactant.

11. The method of applying a closed cell spray foam insulation of claim 8, wherein:
    the spray foam insulation has an R value of at least 6.0 per inch once cured.

12. The method of applying a closed cell spray foam insulation of claim 8, wherein:
    the one or more polyisocyanate compounds of the A-side mixture of the closed cell spray foam insulation comprises methylene diphenyl diisocyanate.

13. The method of applying a closed cell spray foam insulation of claim 8, wherein:
    at least one of the at least two additional layers is sprayed prior to at least a portion of the previous layer reaching a tack-free phase.

14. The method of applying a closed cell spray foam insulation of claim 8, wherein:
    each layer of the spray foam insulation exhibits a dimensional stability of less than about ±15% volumetric change at 70° C. at 97% relative humidity across an entire thickness of the layer once cured.

15. The method of applying a closed cell spray foam insulation of claim 8, wherein:
    the at least two additional layers comprises three layers; and
    a combined R value of the first layer and the three layers is at least 49.

* * * * *